July 15, 1969 W. R. McKAY 3,455,399

SELF-TIGHTENING DISC GANG

Filed Jan. 13, 1966

INVENTOR
WILLIAM R. McKAY
BY
Cohn and Powell
ATTORNEYS

United States Patent Office 3,455,399

Patented July 15, 1969

3,455,399

SELF-TIGHTENING DISC GANG

William R. McKay, Compton, Calif., assignor to Alexander Manufacturing Co., Yazoo City, Miss., a corporation of Mississippi Filed Jan. 13, 1966, Ser. No. 520,456
Int. Cl. A01b 21/08, 5/16, 7/00
U.S. Cl. 172—599 17 Claims

ABSTRACT OF THE DISCLOSURE

A self-tightening disc gang including a gang section mounted on a shaft between a clamping means at one side and a gang-tightening means at the other side. The gang-tightening means is connected to the gang section and urges the gang section along the shaft to clamp the gang section between the clamping means and the gang-tightening means when the gang section is moved at a different velocity relative to the gang-tightening means.

This invention relates generally to improvements in a disc gang, and more particularly to an improved, self-tightening disc gang.

When a harrow is new, the component parts of the disc gangs are clamped relatively tight together. As the harrow is used, the paint between the parts wears and vibration causes the parts of the disc gangs to become loose. Most instructions with new equipment point out that the end clamps on the disc gangs must be tightened regularly by the user, especially during initial use, if wear on and breakage of such parts is to be minimized or eliminated. However, experience has taught that the user frequently ignores or forgets these instructions, and consequently the disc gangs become loose, wear and break down, thereby causing expense in both parts and time for repair.

It is a major objective of the present invention to provide a disc gang that tightens itself automatically as the harrow is pulled behind a tractor, thereby overcoming the previously mentioned disadvantages by keeping the disc gang tight at all times without reliance on the user for any positive action.

An important objective is achieved by the provision of a gang-tightening means on the shaft which is operatively connected to one side of the gang section and tends to urge the gang section axially along the shaft in a direction toward an associated clamping means on the shaft when the gang section is moved at a different velocity relative to the gang-tightening means, thereby clamping the gang sections therebetween.

Another important objective is obtained in that the gang-tightening means includes a first threaded member on the shaft at one side of the gang section, and a second coacting threaded member attached to and rotatable with the gang section, and connected to the first threaded member, the threaded members relatively turning to urge the gang section axially along the shaft in a direction toward the clamping means, and hence clamp the gang section therebetween, when the gang section is moved at a different velocity relative to the first threaded member.

Still another important objective is realized by the provision of a one-way brake operatively connecting the first threaded member and the gang section, the brake allowing relative turning of the threaded members in one angular direction to cause axial movement of the gang section toward the clamping means, but precluding relative turning of the threaded members in the opposite angular direction that would cause loosening of the gang section.

An important object is provided in that the gang-tightening means includes a spindle on the shaft, the spindle having a threaded shank that is connected to a nut attached to and rotatable with the gang section, the nut backing off the shank to urge the gang section axially along the shaft in a direction toward the clamping means, and hence clamp the gang section therebetween, when the gang section is moved at a different velocity relative to the spindle.

Another important objective is afforded by the provision of a hub on the gang section having a socket into which the threaded shank extends, and by the provision of a coil spring constituting the one-way brake in the socket, one end of the spring being connected to the shank and its periphery engaging the hub. The spring contracts diametrically to allow relative turning of the nut and threaded shank in one angular direction to cause tightening of the gang section, and expands diametrically against the hub to preclude relative turning in the opposite angular direction that would cause loosening of the gang section.

Yet another important object is achieved by the structural arrangement and the connection of a nut sleeve in the hub socket by a fastening means which allows the nut and threaded shank to be relatively turned selectively in an opposite angular direction to restore the nut and spindle to a predetermined position after loosening of the fastening means. This relocation of parts to the original positions is desirable if the parts have been backed off a noticeable distance or if new discs have been installed.

An important object is attained by a disc gang structure in which a pair of gang sections are mounted on the shaft between opposed clamping means, and in which the gang-tightening means is on the shaft between and connected to the gang sections, the gang-tightening means tending to urge one gang section axially along the shaft in a direction toward its associated clamping means while precluding axial movement of the other gang section along the shaft, when one gang section is moved at a different velocity relative to the other gang section.

Another important objective is realized in the disc gang construction previously mentioned in which the gang-tightening means includes a first threaded member on the shaft between the gang sections, and a second threaded member attached to and rotatable with each gang section and connected to the said first threaded member to provide a pair of threaded connections, one of the threaded connections relatively turning in an angular direction to urge a first gang section axially along the shaft in a direction toward its associated clamping means, and hence clamp the first gang section therebetween, when the first gang section is moved at a different velocity relative to a second gang section as the disc gang is swung angularly from one end, and the other threaded connection relatively turning in an angular direction to urge the second gang section axially along the shaft in a direction toward its associated clamping means, and hence clamp the second gang section therebetween, when the second gang section is moved at a different velocity relative to the first gang section as the disc gang is swung angularly from the opposite end.

A further objective is provided by the provision of means that connects the said first threaded member with each gang section to preclude relative turning of either threaded connection in an angular direction tending to loosen the associated gang section while the other threaded connection is relatively turned in the angular direction tending to tighten the associated gang section.

An important objective is afforded in the above mentioned disc gang construction by making one of the threaded connections with a right-hand thread and making the other threaded connection with a left-hand thread.

Another important object is to provide a disc gang that is simple and durable in construction, economical to manufacture and assemble, highly efficient in operation, and which is tightened automatically upon usage.

The foregoing and numerous other objects and advantages of the invention will more clearly appear from the following detailed description of a preferred embodiment, particularly when considered in connection with the accompanying drawing, in which.

Figure 1:
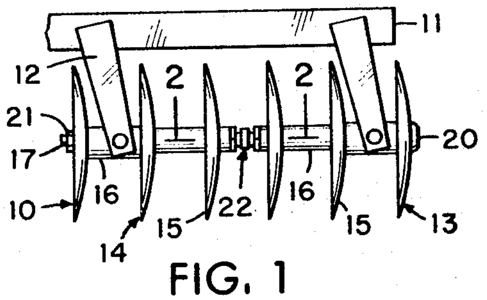
FIG. 1 is a fragmentary, front elevational view of a disc gang mounted to a harrow frame.

Referring now by characters of reference to the drawing, and first to FIG. 1, it will be understood that the disc gang generally indicated by 10 is secured to and depends from a harrow frame 11 by a plurality of brackets 12. The fasteners interconnecting the brackets 12 with the end sleeves 16 extend only partially into the sleeves 16 and not into the shaft 17, and interfit with sufficient clearance to allow relative axial movement of the sleeves 16 along the shaft 17.

The specific self-tightening disc gang 10 includes a pair of gang sections indicated by 13 and 14, each of the gang sections 13 and 14 including a plurality of cutting discs 15 separated and positioned by intervening spacers 16. The gang sections 13 and 14 are slidably and axially mounted in adjacent side-by-side relation on an elongate shaft 17, the shaft 17 having an enlarged head 20 at one end engaging the outside disc of gang section 13 and having a nut 21 threadedly connected to and engaging the outside disc of gang section 14. The shaft head 20 and adjustable nut 21 constitute clamping means adapted to clamp the component parts of the gang sections 13 and 14 therebetween.

The gang-tightening means is mounted on the shaft 17 and is located between the gang sections 13 and 14. The detailed construction and arrangement of the gang-tightening means is best shown in FIGS. 2 and 3.

Figure 2:
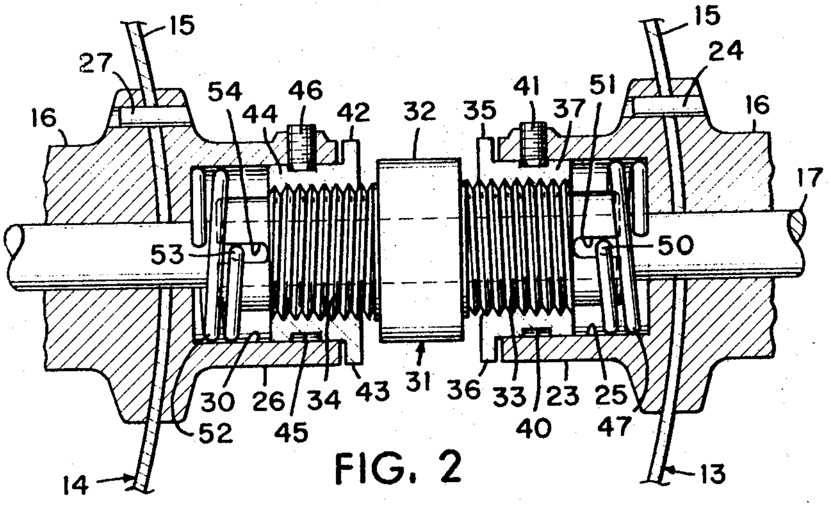
FIG. 2 is an enlarged, cross-sectional view as taken along line 2—2 of FIG. 1.
Figure 3:
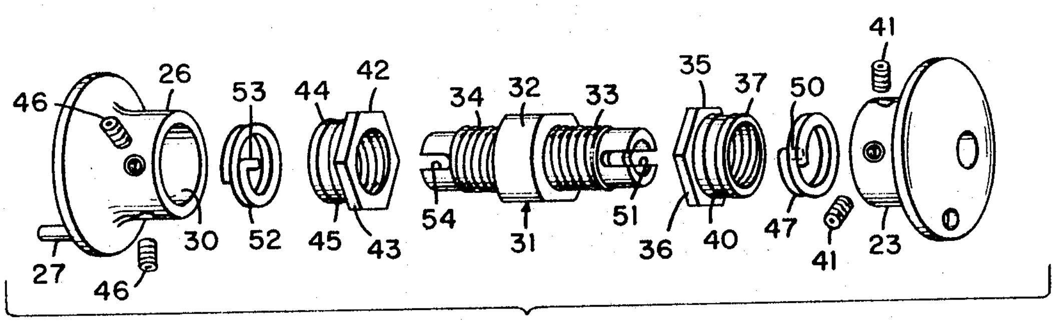
FIG. 3 is an exploded, perspective view of the gang-tightening mechanism shown in FIG. 2.

From FIG. 2 it will be understood that the innermost disc 15 of gang section 13 is mounted on the shaft 17 and disposed flat against one end of adjacent spacer 16. A hub 23 is mounted on shaft 17 and engages the opposite side of the innermost disc 15. It will be noted that hub 23 is secured to the disc 15 and spacer 16 by a pin 24 extending therethrough. For reasons which later appear, the hub 23 is provided with an inwardly-opening socket 25 through which the shaft 17 extends.

Similarly, the innermost disc 15 of the other gang section 14 is mounted on the shaft 17 and has one side contiguous to one end of the adjacent spacer 16. A hub 26 is mounted on the shaft 17 and engages the opposite side of the innermost disc 15 of gang section 14. The hub 26 is secured to the spacer 16 and the intervening innermost disc 15 by a pin 27 extending therethrough. The hub 26 is provided with an inwardly-opening socket 30 through which the shaft 17 extends. It will be understood that the sockets 25 and 30 of the hubs 23 and 26 respectively are oppositely disposed and face each other.

An elongate spindle 31, constituting a threaded member, is mounted on shaft 17 between the gang sections 13 and 14. The spindle 31 includes a collar or wrench head 32 and threaded shanks 33 and 34 extending oppositely and respectively into the hub sockets 25 and 30. For reasons which later appear, the threaded shank 33 is provided with a right-hand thread while the threaded shank 34 is provided with a left-hand thread.

A nut 35, constituting a threaded member, is threadedly connected to the shank 33 to provide a threaded connection. The nut 35 includes a wrench head 36 located outwardly of the hub socket 25, and a sleeve 37 extending into the hub socket 25. The nut sleeve 37 is provided with an annular groove 40 located within the hub socket 25. A screw 41, constituting a fastening means, extends through the hub 23 and into the annular groove 40 for engagement with the nut sleeve 37. The screw 41 fixes the nut 35 securely to the hub 23 so that these parts are rotatable together.

Another nut 42, constitutintg a threaded member, is attached to the threaded shank 34, the nut 42 and shank 34 providing another threaded connection. The nut 42 includes a wrench head 43 located outside of the hub socket 30, and a sleeve 44 extending into the hub socket 30. Formed in the periphery of the nut sleeve 44 is an annular groove 45. A screw 46, constituting a fastening means, extends through the hub 26 and into the annular groove 45 for engagement with the nut sleeve 44. The screw 46 secures the nut 42 to the hub 26 so that such parts rotate as a unit on the threaded shank 34.

A one-way brake operatively interconnects each shank 33 and 34 with its associated gang section 13 and 14 respectively. More particularly, the one-way brake interconnecting the shank 33 and gang section 13 consists of a coil spring 47 located within the hub socket 25. One end 50 of spring 47 is located in a transverse slot 51 formed in the end of the shank 33. The slot 51 is aligned with the longitudinal axis of shaft 17 and shank 33. The periphery of spring 47 frictionally engages the hub 23 defining the socket 25. The spring 47 can have a substantially square cross-section so as to provide maximum frictional contact at its periphery with the hub 23.

It will be importantly noted that the spring 47 is wound in a direciton so that upon relative rotation of the gang section 13 and threaded shank 33, whereby the nut 35 backs off the shank 33 and tends to urge the gang section 13 toward the clamping head 20, the spring 47 will be contracted diametrically so as to permit such relative rotation, and so that relative rotation of the gang section 13 and shank 33 in the opposite direction is precluded by expansion of the spring diametrically into frictional contact with hub 33.

The other one-way brake interconnecting the disc gang 14 with the threaded shank 34 consists of a coil spring 52 located within the hub socket 30. One end 53 of spring 52 is received in a transverse elongate slot 54 formed in the end of shank 34. The elongate slot 54 is aligned substantially with the longitudinal axis of shaft 17 and threaded shank 34. The periphery of spring 52 frictionally engages the hub 26 defining the wall of socket 30. Again, spring 52 can have a substantially square cross-section so that there is maximum frictional contact between the spring periphery and hub 26.

It will be importantly noted that the spring 52 is wound oppositely to spring 47 and is wound in a direction so that upon relative rotation of the threaded shank 34 and the gang section 14, whereby the nut 42 backs off the shank 34 and tends to urge the gang section 14 toward the clamping nut 21, the shank 34 will cause a contraction diametrically of the spring 52 to permit such relative rotation, while the shank 34 will cause expansion diametrically of the spring 52 to preclude relative rotation of shank 34 and gang section 14 in the opposite direction by urging the spring periphery tightly against the hub 26.

The self-tightening action provided as to each of the gang sections 13 and 14 will be described in detail for completeness of disclosure. It will be assumed that the disc gangs 13 and 14 are mounted on the shaft 17, that the nuts 35 and 42 are threaded to predetetrmined positions on shanks 33 and 34 respectively with their wrench heads 36 and 43 respectively located closely adjacent the spindle wrench head 32. The nuts 35 and 42 are secured to the hubs 23 and 26 respectively by the fastening screws 41 and 46 respectively, and the springs 47 and 52 are located in the hub sockets 25 and 30 respectively and operatively connected to the shanks 33 and 34 respectively.

Figure 4:
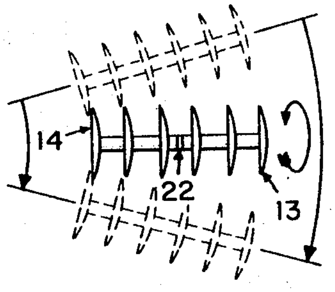
FIG. 4 is a top diagrammatic view illustrating one movement of the disc gang for tightening action.

First, it will be assumed that the tractor makes a right-hand turn so as to swing the disc gang 10 about its left end, as shown diagrammatically in FIG. 4. Under these circumstances, it will be understood that the gang section 13 is moving at a greater velocity than the gang section 14. The tendency of the gang sections 13 and 14 is to rotate in a counterclockwise direction when viewed from the right end, as indicated by the arrow in FIG. 4.

Because the gang section 13 tends to rotate in a counterclockwise direction at a greater velocity than the spindle 31, there will be a tendency for the nut 35 to rotate in a counterclockwise direction relative to the threaded shank 33. Assuming that there is a looseness in the compartment parts comprising the gang section 13, such relative counterclockwise rotation of nut 35 on shank 33 will cause the nut 35 to back off of the shank 33 as a result of the right-hand thread connection. As the nut 35 backs off, the nut 35 urges the gang section 13 axially along the shaft 17 in a direction toward the shaft head 20, constiuting the clamping means, thereby clamping the component parts of gang section 13 tightly between the nut 35 and shaft head 20.

In considering only the relative movement of the nut 35 and threaded shank 33 at this point, it will be understood that while the relative rotation of nut 35 is counterclockwise, the relative rotation of the threaded shank 33 is clockwise. The turning of shank 33 in this relative angular direction causes the spring 47 to contract diametrically and fricitonally disengage from the hub 23, thereby allowing the nut 35 and hub 23 to turn in the relative counterclockwise direction to tighten the gang section 13.

During this same angular movement of the disc gang 10 as indicated in FIG. 4, it will be understood that the spindle 31 is moving at a greater velocity than the gang section 14. Considering only the relatively turning movements of the threaded shank 34 and nut 42, it will be understood that there is a tendency for the threaded shank 34 to turn relatively in a counterclockwise direction, while the coacting nut 42 turns relatively clockwise. Because of the left-hand threads between this threaded connection, the tendency is for the nut 42 to move up on the shank 34 and thereby loosen the component parts comprising gang section 14. However, this relative movement of shank 34 in a counterclockwise direction causes the spring 52 to expand diametrically and forces its periphery against the hub 26 with sufficient force to preclude any relative rotation of shank 34 and hub 26. Consequently, the spring 52 precludes any relative turning movement of shank 34 and nut 42, precludes any movement of the gang section 14 axially on shaft 17, and precludes any loosening of the component parts of such gang section 14.

To summarize the results attained by swinging the disc gang 10 in the direction illustrated in FIG. 4, it will be understood that the component parts comprising gang section 13 are tightened while the relative positions of the component parts of gang section 14 are not affected.

Figure 5:
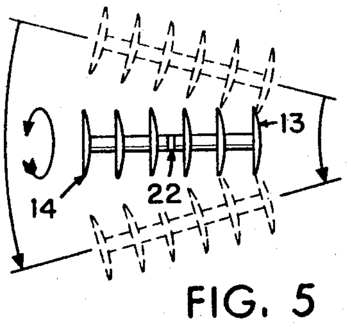
FIG. 5 is a top diagrammatic view of the disc gang illustrating another movement of the disc gang for tightening action.
Figure 6:
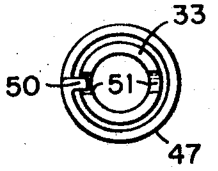
FIG. 6 is an end elevational view illustrating the connection of one brake spring to the center spindle.

It will now be assumed that the disc gang 10 is swung angularly from the right end, as is indicated diagrammatically in FIG. 5, by turning the tractor in a left-hand turn. Under these circumstances, it will be understood that the gang section 14 moves with a greater velocity than the gang section 13.

Because the gang section 14 is moving at a greater velocity relative to the spindle 31, there is a tendency for the nut 42 to rotate in a counterclockwise direction relative to the threaded shank 34 when viewed from the right end of the disc gang. This relative counterclockwise rotation of nut 42 causes the nut 42 to back off of threaded shank 34 and causes the gang section 14 to move axially on shaft 17 in a direction toward shaft nut 21, constituting the clamping means. Assuming that there is a looseness in the component parts of gang section 14, this counterclockwise rotation of nut 42 on shank 34 clamps the component parts of the gang section 14 tightly together between the shaft nut 21 and the nut 42.

If there is a relative counterclockwise rotation of nut 42, there is a relative clockwise rotation of threaded shank 34 during this self-tightening action. This clockwise rotation of shank 34 causes the spring 52 to contract diametrically to remove the spring periphery from effective frictional engagement with the hub 26 and thereby allows this free relative angular movement of shank 34 and nut 42.

During this swinging action of disc gang 10, as shown in FIG. 5, the spindle 31 is moving with a greater velocity than the gang section 13, thereby creating a tendency for the shank 33 to turn counterclockwise relative to the nut 35. This means that the tendency is for the nut 35 to turn relatively clockwise on shank 33. Because of the right-hand thread on this threaded connection, the tendency is for nut 35 to move up on shank 33 and to move the gang section 13 away from the shaft head 20. If this were permitted, the component parts of gang section 13 would be loosened. However, because of the relative counterclockwise rotation of shank 33, the shank 33 causes an expansion diametrically of spring 47 to urge the spring periphery tightly against the hub 23 to prevent relative rotation of shank 33 and hub 23. Accordingly, any axial movement of the gang section 13 is precluded.

To summarize the results achieved by swinging the disc gang 10 from the right end, as illustrated in FIG. 5, the component parts comprising gang section 14 are tightened while the positions of the component parts of gang section 13 on shaft 17 are unaffected.

By making a right-hand turn with the tractor to swing the disc gang 10 about its left end, as illustrated in FIG. 4, the component parts of gang section 13 are tightened, and by making a left-hand turn with the tractor to swing the disc gang 10 about its right end, as illustrated in FIG. 5, the component parts of gang section 14 are tightened.

If, after use, either one or both of gang sections 13 and 14 have been backed off a noticeable distance on spindle 31 or if new discs 15 have been installed, it is desirable to relocate the nuts 35 and 42 on the spindle 31 to their original predetermined positions. This relocation is accomplished by releasing the screws 41 and 46 to disengage operatively the nuts 35 and 42 from the hubs 23 and 26 respectively. By holding the spindle head 32 with a chain wrench and by turning the nuts 35 and 42 with a wrench applied to the nut heads 36 and 43 respectively, the nuts 35 and 42 are brought closer to the spindle head 32 and to the desired, predetermined positions. Then, the shaft nut 21 is tightened on shaft 17 to bring the hubs 23 and 26 back to abutment or close adjacency with the nut heads 36 and 43 respectively, and to clamp the component parts of gang sections 13 and 14 tightly together. The fastening screws 41 and 46 are then retightened to secure the hubs 23 and 26 to the nuts 35 and 42.

Although the invention has been described by making detailed reference to a single preferred embodiment, such detail is to be understood in an instructive, rather than in any restrictive sense, many variants being possible within the scope of the claims hereunto appended.

I claim as my invention:

1. In a self-tightening disc gang:

(a) a shaft, (b) a gang section mounted on the shaft, (c) clamping means on the shaft engaging one side of the gang section, (d) gang-tightening means on the shaft and operatively connected to the other side of the gang section, the gang-tigtening means tending to urge the gang section axially along the shaft in a direction toward the associated clamping means when the gang section is moved at a different velocity relative to the gang-tightening means, (e) the gang-tightening means includes a first threaded member, (f) a second coacting threaded member is attached to and rotatable with the gang section, and is connected to the first threaded member, and (g) the threaded members relatively turn to urge the gang section axially along the shaft in a direction toward the clamping means, and hence clamp the gang section therebetween, when the gang section is moved at a different velocity relative to the first threaded member.

2. A self-tightening disc gang as defined in claim 1, in which:

(h) a one-way brake operatively interconnects the first threaded member and the gang section, the brake allowing relative turning of the threaded members in one angular direction to cause axial movement of the gang section toward the clamping means, but precluding relative turning of the threaded members in the opposite angular direction that would cause loosening of the gang section.

3. In a self-tightening disc gang:

(a) a shaft, (b) a gang section mounted on the shaft, (c) clamping means on the shaft engaging one side of the gang section, (d) gang-tightening means on the shaft and operatively connected to the other side of the gang section, the gang-tightening means tending to urge the gang section axially along the shaft in a direction toward the associated clamping means when the gang section is moved at a different velocity relative to the gang-tightening means, (e) the gang-tightening means includes a spindle on the shaft, the spindle having a threaded shank, and (f) a nut is attached to and rotatable with the gang section, the nut being connected to the threaded shank, and (g) the nut backs off the shank to urge the gang section axially along the shaft in a direction toward the clamping means, and hence clamp the gang section therebetween, when the gang section is moved at a different velocity relative to the spindle.

4. A self-tightening disc gang as defined in claim 3, in which:

(h) a one-way brake operatively interconnects the spindle and gang section, the brake allowing relative turning of the nut and threaded shank in one angular direction to cause tightening of the gang section against the clamping means, but precluding relative turning in the opposite angular direction that would cause loosening of the gang section.

5. A self-tightening disc gang as defined in claim 4, in which:

(i) the gang section includes a hub provided with a socket into which the threaded shank extends, and (j) the one-way brake includes a coil spring located in the socket, one end of the spring being connected to the shank and its periphery engaging the hub, and (k) the spring contracting diametrically to allow relative turning of the nut and threaded shank in one angular direction to cause tightening of the gang section against the clamping means, and expanding diametrically against the hub to preclude relative turning in the opposite angular direction that would cause loosening of the gang section.

6. A self-tightening disc gang as defined in claim 4, in which:

(i) the gang section includes a hub provided with a socket into which the threaded shank extends, (j) the nut includes a sleeve located in the hub socket, (k) fastening means interconnects the hub and nut sleeve, and (l) the nut and threaded shank are relatively rotatable selectively in the said opposite angular direction to restore the nut and spindle to a predetermined position after loosening of the fastening means.

7. A self-tightening disc gang as defined in claim 5, in which:

(l) the nut includes a sleeve located in the hub socket, and (m) the nut and threaded shank are relatively rotatable selectively in the said opposite direction usually precluded by the coil spring to restore the nut and spindle to a predetermined position after loosening of the fastening means.

8. In a self-tightening disc gang:

(a) a shaft, (b) a gang section mounted on the shaft, (c) clamping means on the shaft engaging one side of the gang section, (d) gang-tightening means on the shaft and operatively connected to the other side of the gang section, the gang-tightening means tending to urge the gang section axially along the shaft in a direction toward the associated clamping means when the gang section is moved at a different velocity relative to the gang-tightening means, (e) a first gang section and a second gang section are mounted on the shaft, (f) opposed clamping means are on the shaft engaging the first and second gang sections located therebetween, and (g) the gang-tightening means is on the shaft between and connected to the first and second gang sections, the gang-tightening means tending to urge one gang section axially along the shaft in a direction toward its associated clamping means while precluding axial movement of the other gang section along the shaft when one gang section is moved at a different velocity relative to the other gang section.

9. A self-tightening disc gang as defined in claim 8, in which:

(h) the gang-tightening means tends to urge one gang section axially along the shaft in a direction toward its associated clamping means while precluding axial movement of the other gang section along the shaft when said one gang section is moved at a greater velocity than the said other gang section, and (i) the gang-tightening means tends to urge the said other gang section axially along the shaft in a direction toward its associated clamping means while precluding axial movement of the said one gang section along the shaft when said other gang section is moved at a greater velocity than the said one gang section.

10. A self-tightening disc gang as defined in claim 8, in which:

(h) the gang-tightening means includes a first threaded member on the shaft between the first and second gang sections, (i) a second threaded member attached to and rotatable with the first gang section and connected to the first threaded member, (j) a third threaded member attached to and rotatable with the second gang section, and connected to the first threaded member, (k) the first and second threaded members relatively turning in an angular direction to urge the first gang section axially along the shaft in a direction toward its associated clamping means, and hence clamp the first gang section therebetween, when the first gang section is moved at a different velocity relative to the second gang section as the disc gang is swung angularly from one end, and (l) the first and third threaded members relatively turning in an angular direction to urge the second gang section axially along the shaft in a direction toward its associated clamping means, and hence clamp the second gang section therebetween, when the second gang section is moved at a different velocity relative to the first gang section as the disc gang is swung angularly from the opposite end.

11. A self-tightening disc gang as defined in claim 10, in which:

(m) means interconnects the first threaded member with each gang section to preclude relative turning of either associated pair of threaded members in an opposite angular direction tending to loosen the associated gang section while the other of the associated pair of threaded members is relatively turned in the said angular direction tending to tighten the associated gang section.

12. A self-tightening disc gang as defined in claim 11, in which:

(n) one of the associated pair of threaded members has a right-hand thread while the other of the associated pair of threaded members has a left-hand thread.

13. A self-tightening disc gang as defined in claim 8, in which:

(h) the gang-tightening means includes a spindle on the shaft between the gang sections, the spindle having oppositely disposed, threaded shanks, (i) a nut is attached to and rotatable with one gang section, and is connected to one of the threaded shanks to provide a threaded connection, (j) another nut is attached to and rotatable with the other gang section, and is connected to the other threaded shank to provide another threaded connection, and (k) one or the other of the said threaded connections relatively turn in an angular direction to urge its associated gang section axially along the shaft in a direction toward its associated clamping means, and hence clamp the associated gang section therebetween, when the gang sections are moved at different relative velocities as the disc gang is swung angularly from one or the other of its ends respectively.

14. A self-tightening disc gang as defined in claim 13, in which:

(l) a one-way brake operatively interconnects each threaded shank with its associated gang section, each brake allowing relative turning of its associated threaded connection in one angular direction to cause tightening of the associated gang section, but precluding relative turning in the opposite angular direction that would cause loosening of the associated gang section.

15. A self-tightening disc gang as defined in claim 14, in which:

(m) one of the threaded connections has a right-hand thread while the other threaded connection has a left-hand thread.

16. A self-tightening disc gang as defined in claim 15, in which:

(n) each gang section includes a hub provided with a socket into which the associated threaded shank extends, and (o) each one-way brake includes a coil spring located in one of the hub sockets, one end of each spring being connected to the associated shank and peripherally engaging the associated hub, each spring contracting diametrically to allow relative turning of the associated threaded connection in one angular direction to cause tightening of the associated gang section, and expanding diametrically against the associated hub to preclude relative turning of the associated threaded connection in the opposite direction that would cause loosening of the associated gang section.

17. A self-tightening disc gang as defined in claim 15, in which:

(n) each gang section includes a hub provided with a socket into which the associated threaded shank extends, (o) the nut of each threaded connection includes a sleeve located in one of the hub sockets, (p) fastening means interconnects each hub and associated nut sleeve, and (q) each threaded connection is relatively rotatable selectively in the angular direction usually precluded by the associated one-way brake so as to restore the threaded connection in a predetermined position after loosening of the fastening means.

References Cited

UNITED STATES PATENTS

| | | | |
|---|---|---|---|
| 1,944,674 | 1/1934 | Silver | 172—568 X |
| 2,324,064 | 7/1943 | Coffing | 172—570 |

ABRAHAM G. STONE, Primary Examiner

STEPHEN C. PELLEGRINO, Assistant Examiner

U.S. Cl. X.R.

172—582